UNITED STATES PATENT OFFICE.

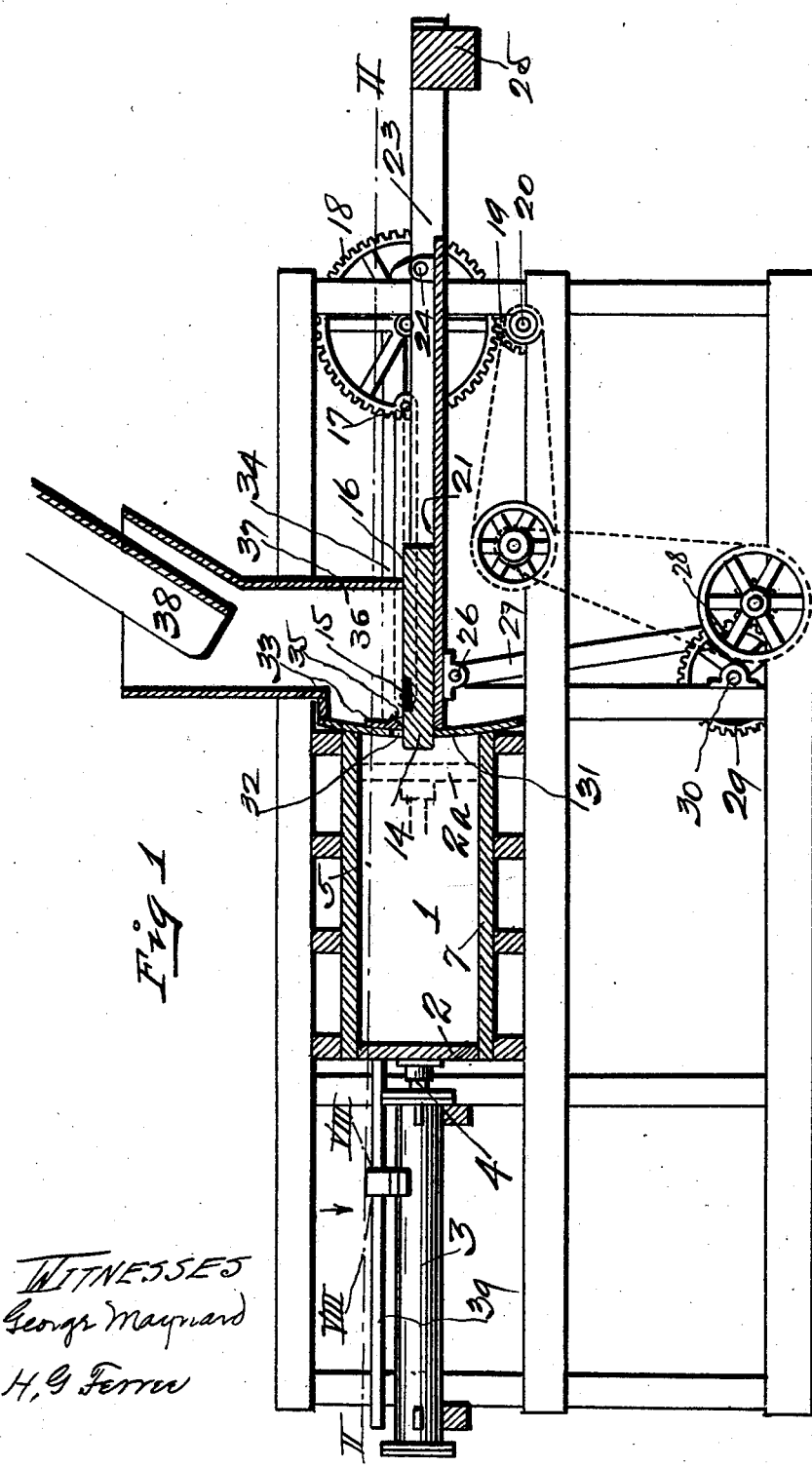

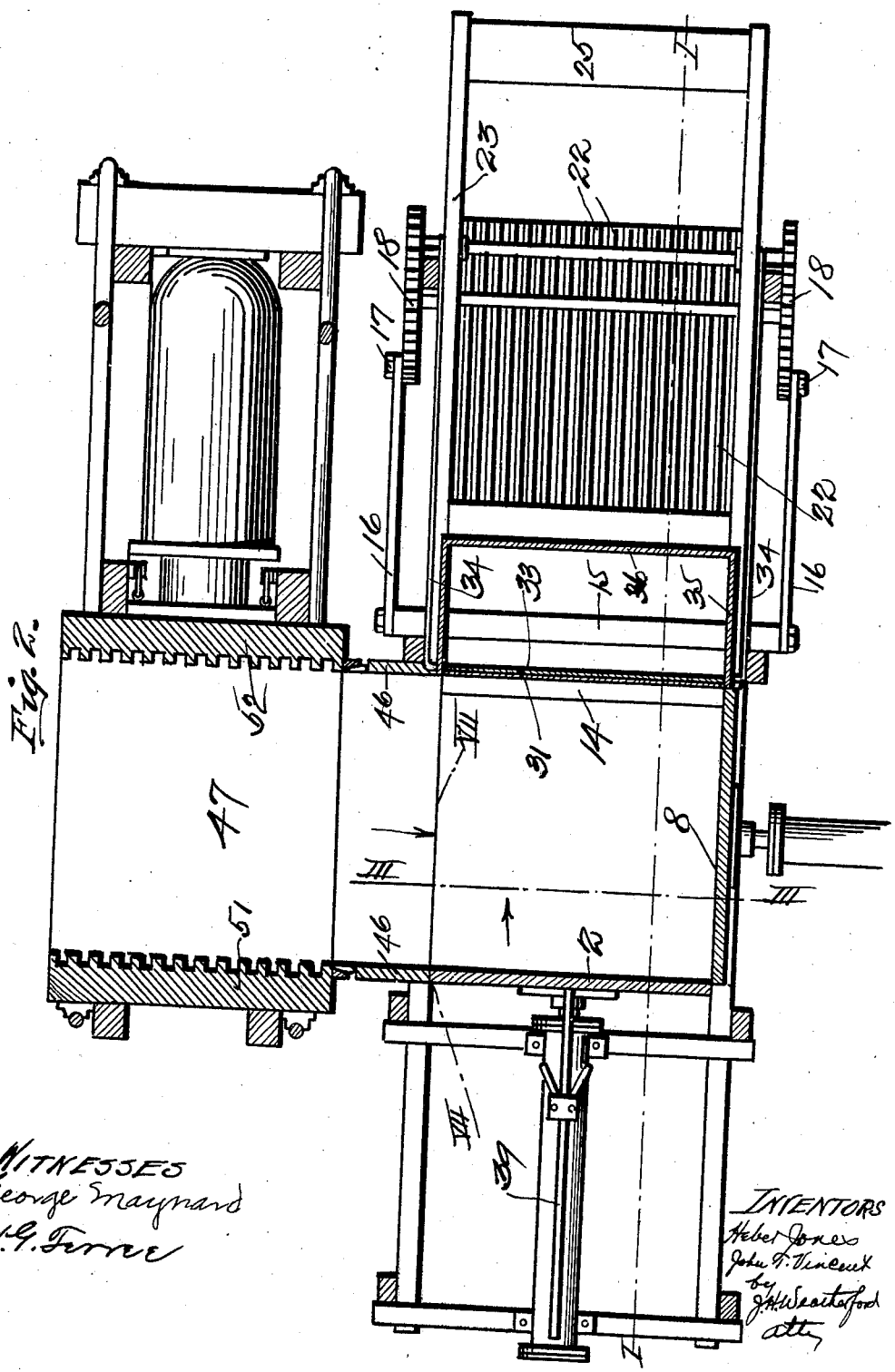

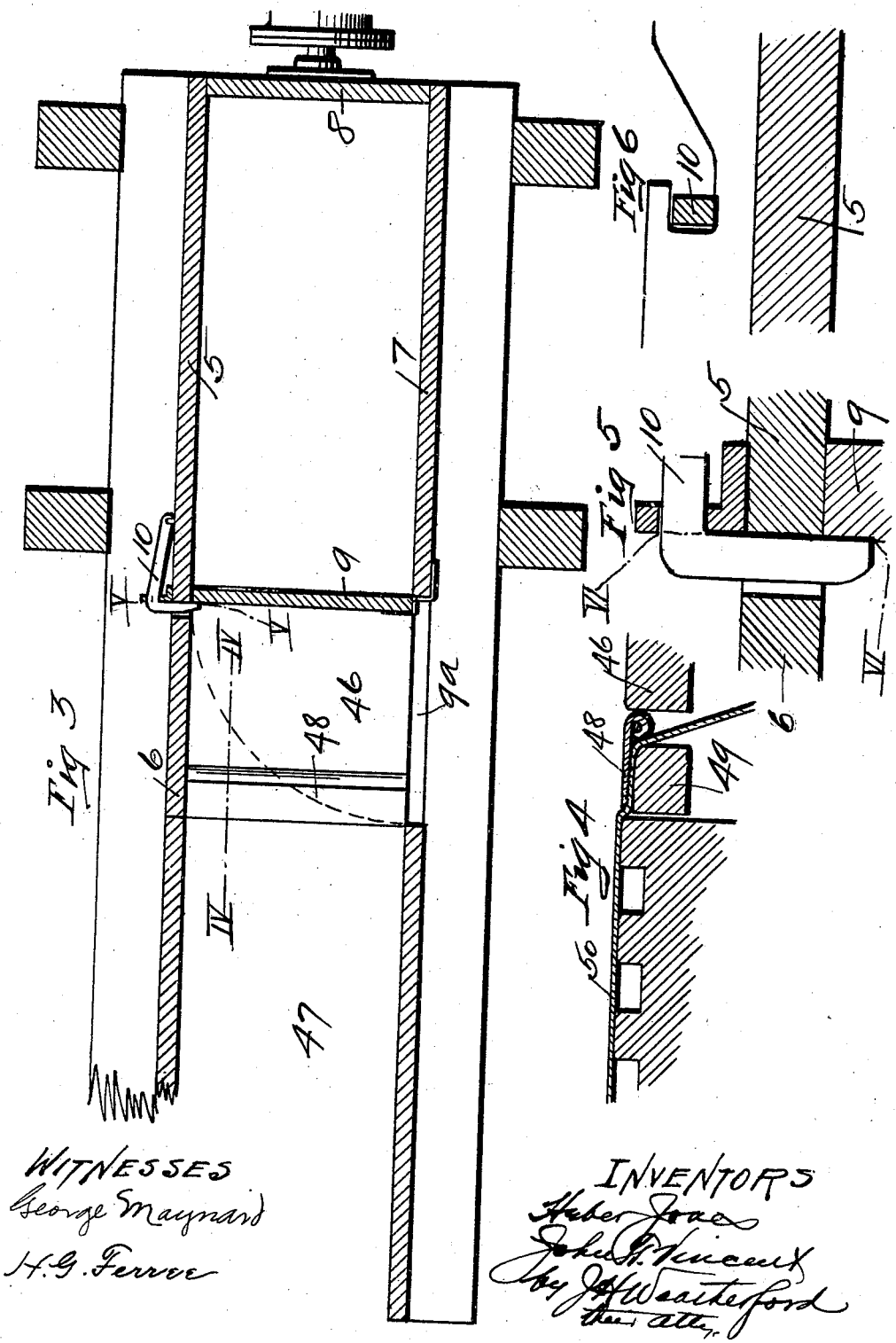

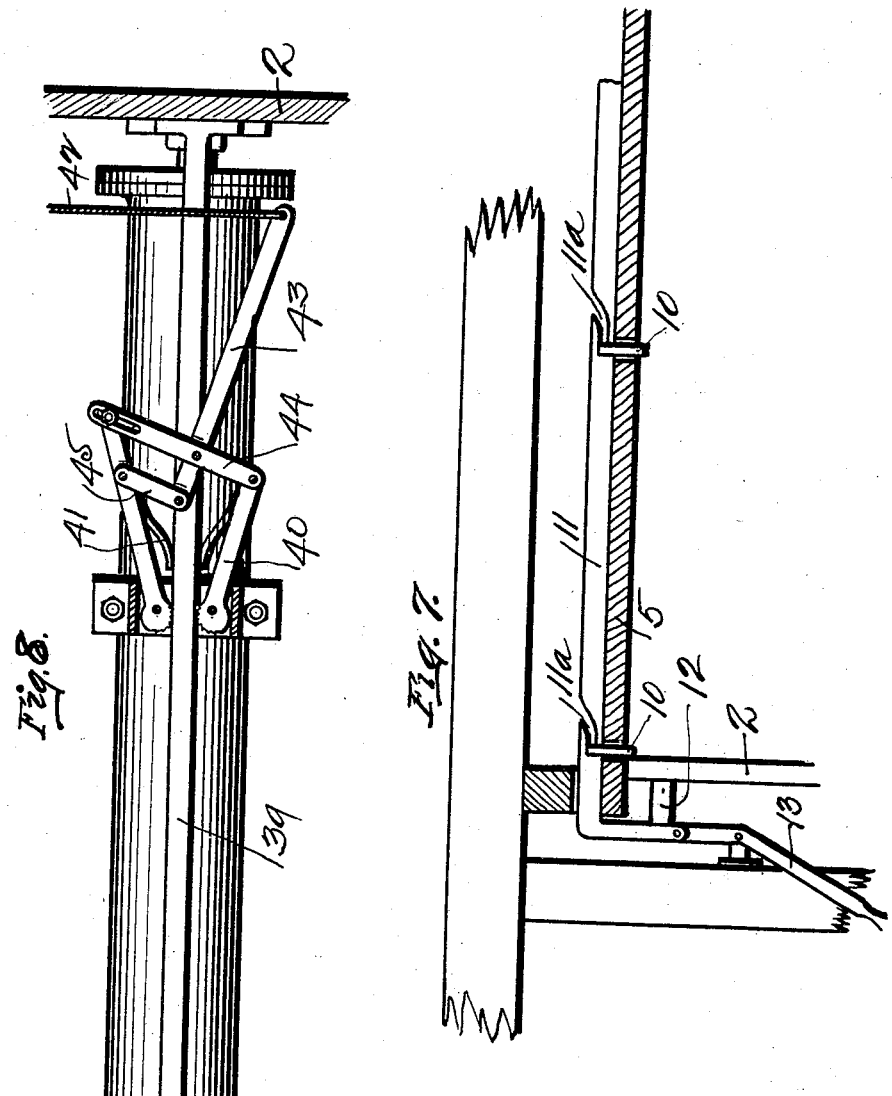

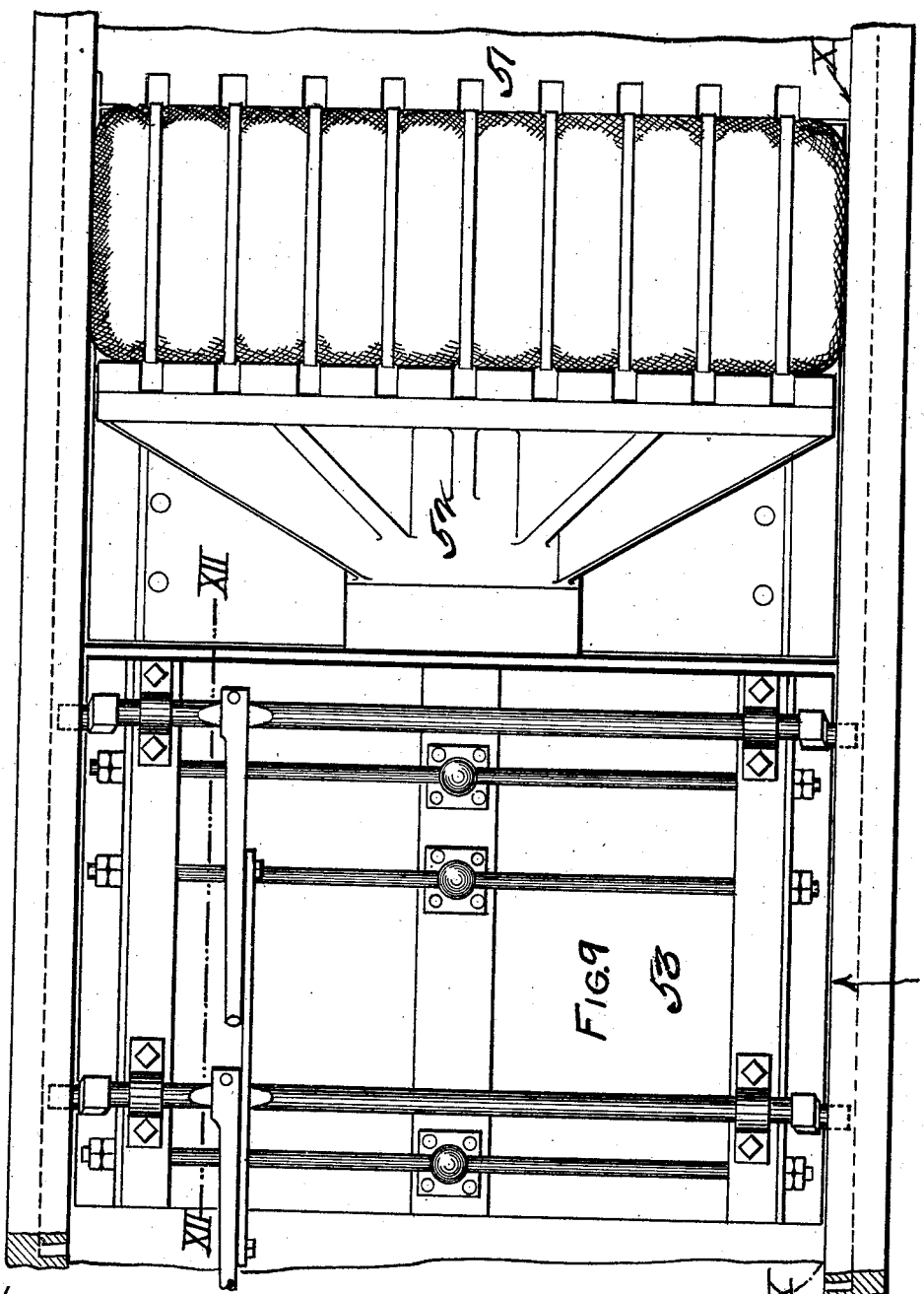

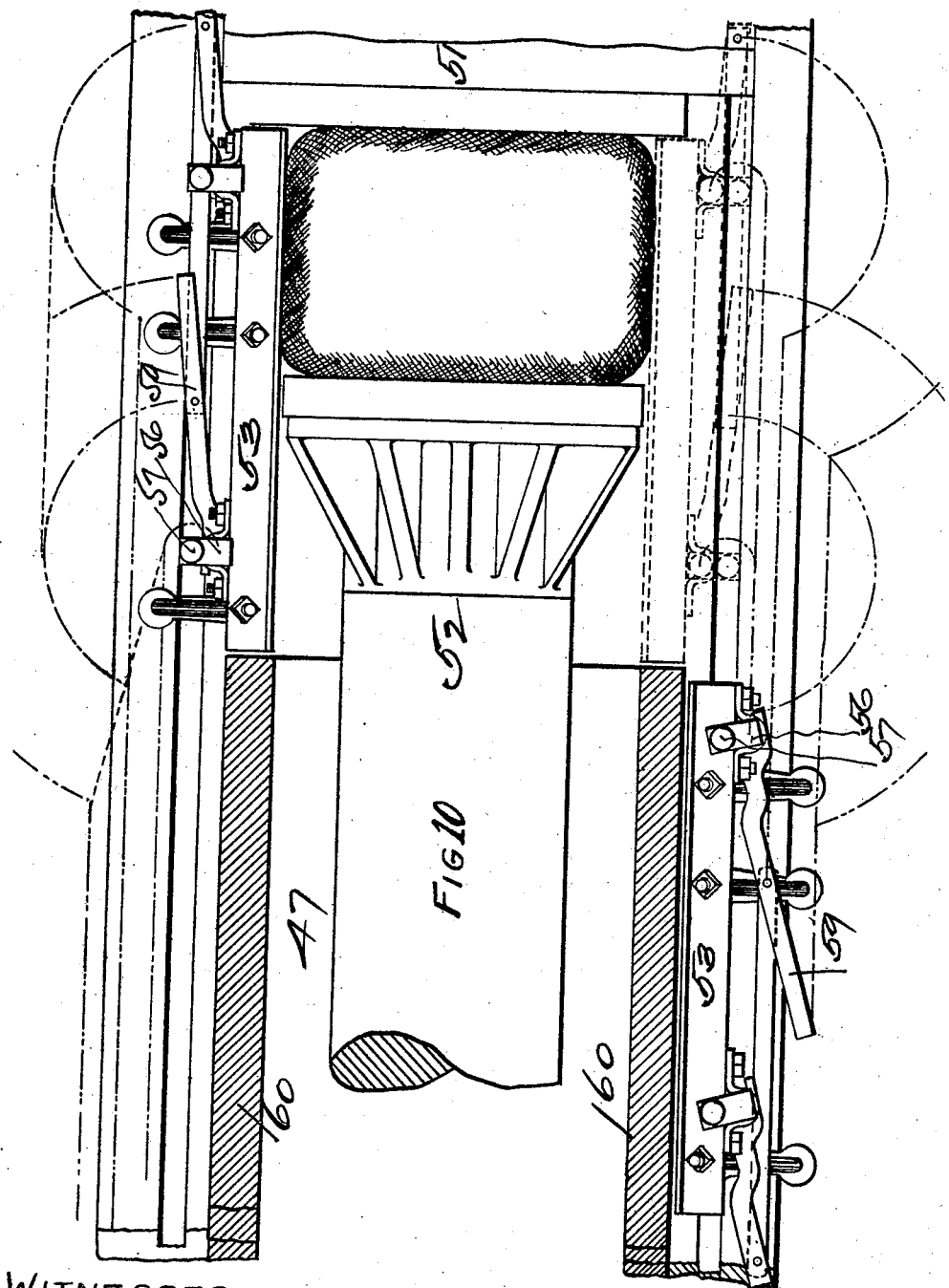

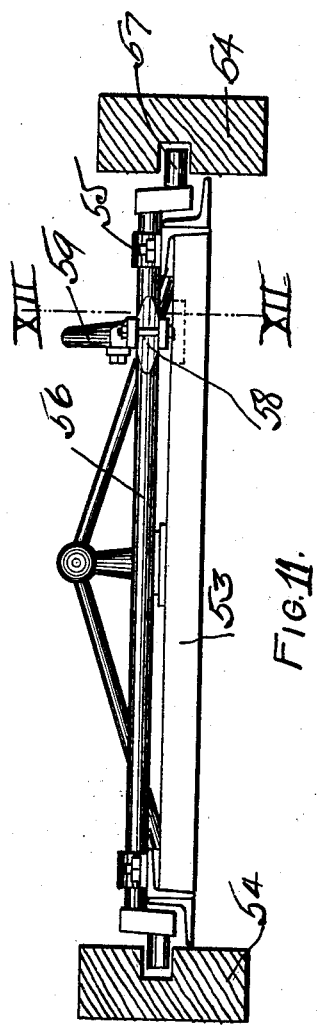
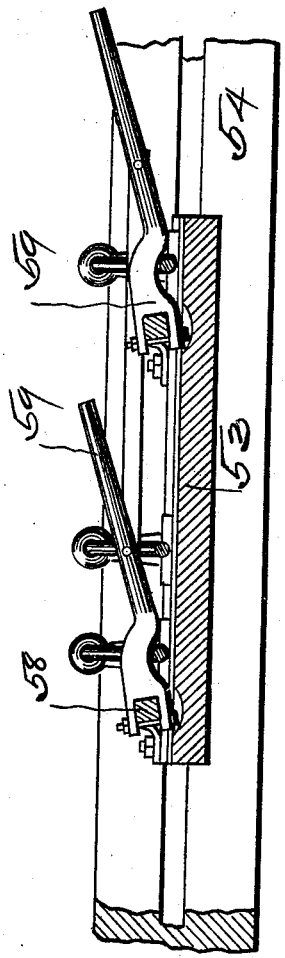

HEBER JONES AND JOHN T. VINCENT, OF MEMPHIS, TENNESSEE.

COTTON-BALING PRESS.

No. 828,213.　　　Specification of Letters Patent.　　　Patented Aug. 7, 1906.

Application filed July 19, 1904. Serial No. 217,216.

*To all whom it may concern:*

Be it known that we, HEBER JONES and JOHN T. VINCENT, citizens of the United States, residing at Memphis, Shelby county, State of Tennessee, have invented certain new and useful Improvements in Cotton-Baling Presses, of which the following is a specification.

Our invention relates to certain new and useful improvements in cotton-baling presses, and has particular reference to that class of presses described in Patent No. 730,347, dated June 9, 1903, issued to Pearl K. Crowell. This patent described a machine in which cotton is baled in a chamber against a receding head by means of a plunger of the full width of the head, but of less height, so that the cotton is forced in in successive bats of the full width of the head, but of less height. In order to make a bale with this press, it is necessary to put successive bats against this head across the height of same, and in order to do this the entire baling-chamber is raised and lowered slowly, so that the bats would occupy a position one above the other as the chamber is lowered and one below the other as it is raised. By this method it is necessary not only to raise the baling-chamber, but the increasing bale as well.

It is the object of our invention, first, to provide certain improvements whereby the baling-chamber carrying the receding head is stationary and the feeding-chamber and plunger therein are moved up and down to accomplish the result hereinbefore indicated; second, to provide means of steadying the receding plunger-head; third, to provide means of placing and holding the bale-bagging; fourth, to provide means of closing the sides of the baling-chamber and of releasing one of same when a bale is completed; fifth, to provide means of closing and opening the top and bottom of the compress-box, and, sixth, to generally improve the details of the press. We accomplish these objects as will be more fully hereinafter set forth in the drawings, specification, and claims.

In the drawings, Figure 1 is a sectional side elevation of our press, taken on the line I I of Fig. 2. Fig. 2 is a sectional plan taken on the line II II of Fig. 1 looking down, showing compress by which the bale is directly compressed after it has been formed. Fig. 3 is an enlarged detail section taken on the line III III of Fig. 2. Fig. 4 is an enlarged detail section on the line IV IV of Fig. 3. Fig. 5 is a fragmentary detail section taken on the line V V of Fig. 3. Fig. 6 is a detail section on the line VI VI of Fig. 5. Fig. 7 is a fragmentary section on the line VII VII of Fig. 2 and the line V V of Fig. 3. Fig. 8 is a sectional plan taken on the line VIII VIII of Fig. 1. Fig. 9 is a plan of the compress-box, showing the top door of the box moved back to permit access to the bale. Fig. 10 is a sectional side elevation of the compress-box, taken on the line X X of Fig. 9. Fig. 11 is an end elevation of one of the doors, and Fig. 12 a sectional side elevation on the line XII XII of Fig. 11.

Referring now to the drawings, in which like numerals indicate the same or like parts in all the views, 1 is a baling-chamber having a receding head 2, which is held forward by means of fluid-pressure in a cylinder 3, which pressure acts through the piston-rod 4 or by friction or other mechanical means. In this view the receding head 2 is shown as entirely retracted, as it would be were there a bale in the press, while the dotted position 2ª shows about the position the head will occupy when a bale is being begun.

5 is the top of the baling-chamber and is preferably made with an extension 6 continuous with it, which extends across to the compress, which will be hereinafter mentioned.

7 is the bottom of the baling-chamber.

The sides of the chamber 1 are closed, one by the follower-head 8, which is also used to push the bale into the compress, and the other by a door 9, hinged to the bottom 7 and normally held in place by latches 10, the action of which will be more fully described later. When open, (or down,) the door 9 fills the space 9ª between the bottom of the baling-chamber and the bottom of the compress-box and, with the top piece 6, forms a smooth continuous passage from one to the other. The latches 10 are raised and lowered by a bar 11, which extends longitudinally of the baling-box and is operated by a block 12 on the head 2 when same has been forced back by the bale. As shown in Fig. 7, the latches 10 are fully down and the block 12 is just engaging the box 11 to release and raise them. Besides this automatic release at the completion of a bale a hand-lever 13 is provided for use on special occasions or in an emergency. The bar 11 is provided with notches 11ª, which raise the latches 10 when the said bar is pulled out and which act to hold down the latches when the bar is pushed in. Cotton is packed into this chamber against the receding head 2 by means of a plunger 14, operated by a cross-head 15, projecting beyond the sides of the plunger and reciprocated by connecting-rods 16, the opposite ends of which are carried by crank-pins 17 on gears 18, which gears form the crank-arms. The gears 18 are driven by pinions 19, mounted on a shaft 20, which may be belt driven or otherwise, as desired. As the gears 18 rotate the cross-head 15 is moved back and forth, carrying the plunger 14, which slides on the bottom of a lint-collecting or feeder trough 21. This trough has a bottom which is preferably smooth, but which may have raised cleats 22, with spaces between, on which the plunger 14 slides. 23 represents the sides of this trough, and these are as high as they can be made and still allow the cross-head 15 to slide. These sides 23 are mounted on a shaft 24, thus forming a pivot-bearing for the packer-trough and they may extend beyond the said shaft and carry a balance-weight 25. At the opposite end the feeder-trough is supported by a shaft or pin 26, which is in turn supported and reciprocated by connecting-rods 27, crank-pins 28, and crank-disks 29. These crank-disks 29 are mounted on a shaft 30, and this is driven, preferably, by reducing sprocket-chain and spur-gearing from the shaft 28. The speed of the crank-disks is such that the plunger 14 makes quite a number of strokes during each complete cycle of raising and lowering the feeder-trough. The forward end of the feeder-trough is made with a pressure-breast 31, integral therewith, and therefore moving with it. The plunger 14 passes through an opening 32 in the center of this breast, forcing the cotton into the baling-chamber 1 and on withdrawal allowing it to come against the breast. This opening is slightly larger than the plunger 14 and when same is withdrawn is partially closed by a slide 33 behind the shield or breast 31. This slide 33 is carried by two arms 34, pivoted on the shaft 24 and is therefore concentric with the breast 31, and since it comes entirely behind the breast and therefore has no pressure against it is free to drop down when the plunger is withdrawn. A cam-shaped piece 35 is caught by the end of the plunger 14 and is raised by it to permit its passage. Since the plunger is of less height than the baling-chamber, it pushes back a small portion only of the cotton, the balance being directly held by the breast. As the feeder-chamber rises the breast slides on the end of the bale, allowing the plunger to reach successively the entire face of the bale. Sides 36, Fig. 2, are continued back from the breast and a back put across connecting them to form a hopper 37, which is integral with the feeder-trough. The plunger 14 moves freely beneath this hopper 37, the back raking the cotton from the top of the plunger as same is retracted.

38 is a stationary chute through which the cotton drops into the feeder-chamber.

The cotton falls on the plunger 14 and is dropped as this recedes onto the bottom of the feeder-trough. As the plunger again moves forward the cotton is forced out into the baling-chamber 1.

Fluid-pressure is carried in the cylinder 3 (by pipe connection, not shown) to give the bale the density required. This pressure is preferably steam and is therefore unstable.

39 is a smooth rod fastened to the receding head 2 and passing from same between clamps 40, which grip it and hold it when it is forced back by the stroke of the plunger 14. These clamps are normally held against the rod 39 by springs 41, but may be released by a pull on the rope 42, acting through the lever-arms 43, 44, and 45.

46 represents side or end pieces corresponding with the position of the receding head 2, when in its limiting position, and with the breast 31, which end pieces form, with the piece 6 and the door 9, (when the latter is in the position 9ª,) a box connecting the baling-chamber with the compress-box 47.

48 represents swinging pieces preferably of metal, roughened or serrated on their backs, which are hinged to the pieces 46 and rest against posts 49. These pieces 48 are turned back to permit the insertion of the bagging 50 and when in place hold it securely while the bale is being pushed into place.

When the bale is in the compress, the door 9 may be pushed up out of the way to permit access to the bale.

Referring now more especially to Figs. 9 and 10, 51 is the stationary compress-head, and 52 the plunger-head. The top and bottom of the box are closed by sliding doors 53, which are identical and therefore described together. These doors are trussed to give them greater strength and are carried by grooved frames 54. 55 represents bearings on the outside of the doors, in which are mounted shafts 56, which are cranked at their ends 57, the said ends extending into said grooved frames 54. These shafts 56 are squared at 58 to take an arm 59, which turns same. When the cranked ends 57 are turned down, as shown in Figs. 11 and 12, the doors 53 are raised and may be slipped back to permit access to the compressed bale, and when the doors are in position and the cranked ends are turned up the doors are forced down into position and form a continuation of the fixed top and bottom 60 of the compress-box 47. In Fig. 10 the upper door 53 is shown in elevation as it appears when closed in place, while the lower door is shown open and slipped to the side to permit access to the bale.

In operation cotton is fed through the hopper 37 onto the plunger 14, which moving backward drops this cotton into the feeder-trough and then on its outward stroke forces same into the baling-chamber 1. In the meantime the feeder-trough is being moved slightly upward or downward, so that on the next stroke the plunger forces the cotton into the baling-chamber in a slightly-different place. Increments are therefore added successively across the face of the bale alternately from top to bottom and bottom to top. As the cotton is forced into the baling-chamber the receding head 2 moves backward under a constant pressure until the box shall have been filled, being steadied by the rod 39 and clamps 40. The door 9 is then automatically dropped by the latches 10, actuated by the bar 11. At this time the plunger 14 is brought flush with the face of the pressure-breast 31, the bagging is placed, and the bale is moved over until it comes into the compress-box 47 by an auxiliary head 61, which is moved by a piston-rod 62, actuated by the cylinder 63, and is then compressed. After compression, the doors 43 are thrown open and moved out of the way, the door 9 is pushed up to its normal position as a part of the baling-chamber, and free access is thus afforded to the top, bottom, and ends of the bale.

Having fully described our invention, what we claim, and desire to secure by Letters Patent in the United States, is—

1. In a press for baling cotton or other fibrous material the combination with a baling-chamber and means of placing cotton in said chamber, of a head-block receding against pressure a rod fastened to said head and clamps to grip said rod substantially as shown and described.

2. In a press for baling cotton or other fibrous material the combination with a baling-chamber and means of placing cotton in said chamber, of a head-block receding against pressure, a rod fastened to said head, clamps to grip said rod, and springs to hold said clamps against said rod.

3. In a press for baling cotton or other fibrous material the combination with a baling-chamber and means of placing cotton in said chamber, of a head-block receding against pressure, a rod fastened to said head, clamps to grip said rod, springs to hold said clamps against said rods and means of releasing said clamps substantially as shown and described.

4. In a press for baling cotton or other fibrous material, the combination with a baling-chamber and means of placing cotton in said chamber, of a head-block receding against pressure, a rod fastened to said head, clamps to grip said rod, springs to hold said clamps against said rods, arms extending outward from said clamps and levers attached to said arms to release said clamps, substantially as shown and described.

5. In a press for baling cotton the combination with a baling-chamber, of a breast having an opening therethrough, a plunger reciprocating through said breast, and a swinging cut-off behind said breast, substantially as shown and described.

6. In a press for baling cotton the combination with a baling-chamber, of a breast having an opening therethrough, a plunger reciprocating through said breast, a swinging cut-off behind said breast and a cam on the said cut-off, substantially as and for the purposes set forth.

7. In a press for baling cotton or other fibrous material, having a baling-chamber, and a head-block receding against pressure, the herein-described apparatus for packing cotton against said head-block, comprising a packing-chamber, a hopper above and integral with said chamber, a pressure-breast attached to said chamber, a plunger reciprocating in said chamber under said hopper and through said breast, and a swinging cut-off behind said breast, substantially as and for the purposes set forth.

8. In a press for baling cotton or other fibrous material having a baling-chamber, and a head-block receding against pressure, the herein-described apparatus for packing cotton against said head-block, comprising a packing-chamber, a hopper above and integral with said chamber, a pressure-breast attached to said chamber, a plunger reciprocating in said chamber under said hopper and through said breast, a swinging cut-off behind said breast and a cam on said cut-off substantially as and for the purposes set forth.

9. In a combined baling-press and compress, the combination with a baling-chamber, a head-block receding against pressure, a door closing one side of said baling-chamber, latches to hold said door in place, a trip for said latches and means operated by said receding head for operating said trip to release said door substantially as and for the purposes set forth.

10. In a combined baling-press and compress, the combination with a baling-chamber and a compress-chamber, of a top and sides forming an open-bottom box connecting said chambers and a door for one side of said baling-chamber, said door forming when open the bottom for said connecting-box, substantially as shown and described.

11. In a combined baling-press and compress, the combination with a baling-chamber and a compress-chamber, of a top and sides forming an open-bottom box connecting said chambers, and a door for one side of said baling-chamber, said door forming when open the bottom for said connecting-box, latches to hold said baling-chamber door closed and a trip to release said latches, substantially as shown and described.

12. In a combined baling-press and compress, the combination with a baling-chamber, and a compress-chamber, of a top and sides connecting said chambers and metal doors having roughened under surfaces, hinged to said sides, substantially as and for the purposes set forth.

13. In a compress, the combination with grooved side frames top and bottom, of cranked rods sliding in said grooved frames and doors mounted on said cranked rods, substantially as and for the purposes set forth.

14. In a compress the combination with grooved side frames top and bottom, of cranked rods sliding in said grooved frames doors mounted on said cranked rods, lever-arms mounted on said cranked rods to throw said cranked rods and release said doors substantially as shown and described.

In testimony whereof we have signed our names to this specification in the presence of two subscribing witnesses.

HEBER JONES.
JOHN T. VINCENT.

Witnesses:
B. F. COLEMAN.
LEWIS NEMORE.